(12) United States Patent
Bockman

(10) Patent No.: US 6,290,301 B1
(45) Date of Patent: Sep. 18, 2001

(54) SELF-DUMPING CART

(76) Inventor: Richard K. Bockman, 2018 320th Ave., Terril, IA (US) 51364-7010

( * ) Notice: Subject to any disclaimer, the term of this patent is extended or adjusted under 35 U.S.C. 154(b) by 0 days.

(21) Appl. No.: 09/548,543

(22) Filed: Apr. 13, 2000

(51) Int. Cl.[7] ........................................................ B60P 1/00
(52) U.S. Cl. ................................. 298/5; 298/175; 298/10; 298/20 R
(58) Field of Search .................................. 298/5, 10, 175, 298/20 R; 280/47.1, 47.23, 47.26

(56) References Cited

U.S. PATENT DOCUMENTS

| | | |
|---|---|---|
| 149,806 | 4/1874 | Swan . |
| 955,878 | 4/1910 | Jacklin . |
| 1,047,009 * | 12/1912 | Edgington ................................ 298/5 |
| 1,563,685 | 12/1925 | Boys . |
| 2,131,326 | 9/1938 | Kaster ...................................... 298/5 |
| 2,436,443 | 2/1948 | Meisenhelder ......................... 298/19 |
| 2,491,417 | 12/1949 | Pflatz et al. .............................. 298/5 |
| 2,546,030 * | 3/1951 | Grewe ................................. 298/20 R |
| 2,925,186 | 2/1960 | Anderson et al. . |
| 3,260,547 | 7/1966 | Heilig et al. .............................. 298/5 |
| 3,547,290 | 12/1970 | Fratzke et al. . |
| 3,578,806 | 5/1971 | Tonelli .................................... 298/2 |
| 4,417,765 | 11/1983 | Wirsbinski ............................... 298/5 |
| 4,659,147 | 4/1987 | Smiltneek .............................. 298/20 |
| 4,711,499 | 12/1987 | Fortin ...................................... 298/5 |
| 4,861,110 * | 8/1989 | Rumpke ............................... 298/5 X |
| 4,889,390 | 12/1989 | Campbell ................................. 298/5 |
| 5,395,163 * | 3/1995 | Mandell et al. ..................... 298/5 X |
| 5,544,944 * | 8/1996 | Keech ..................................... 298/5 |

* cited by examiner

Primary Examiner—Stephen T. Gordon
(74) Attorney, Agent, or Firm—Zarley, McKee, Thomte, Voorhees & Sease

(57) ABSTRACT

An apparatus and method for an improved self-dumping cart. The dump cart has a box pivotally mounted on a frame and wheels. The cart box is normally locked to the frame in an upright position for loading and towing. Then to dump, the box is unlocked from the frame and locked to at least one of the wheels, so that upon rotating the wheels in a rearwardly direction, the cart is dumped. Preferably, the box pivots 180° between the loading and unloading positions.

12 Claims, 9 Drawing Sheets

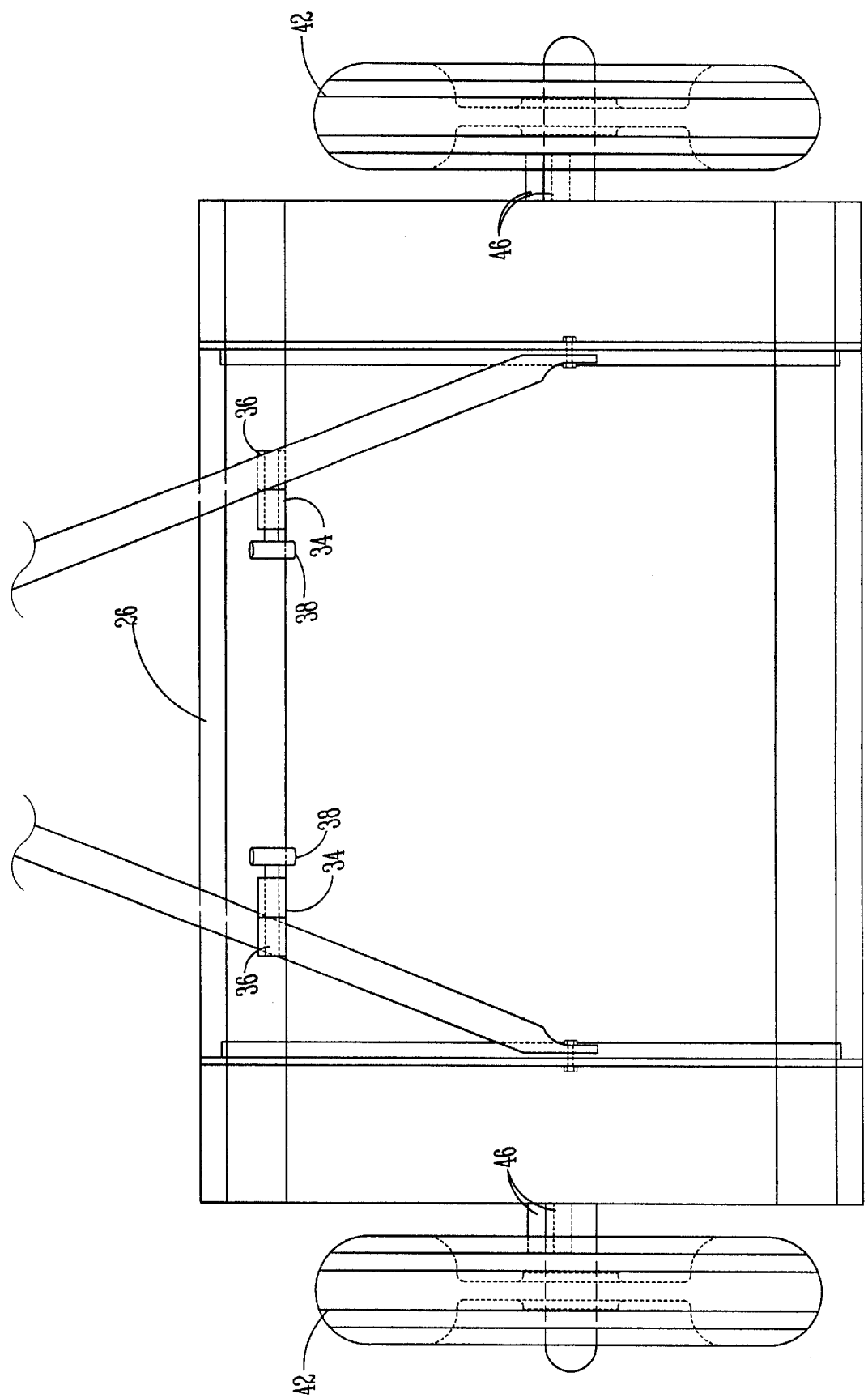

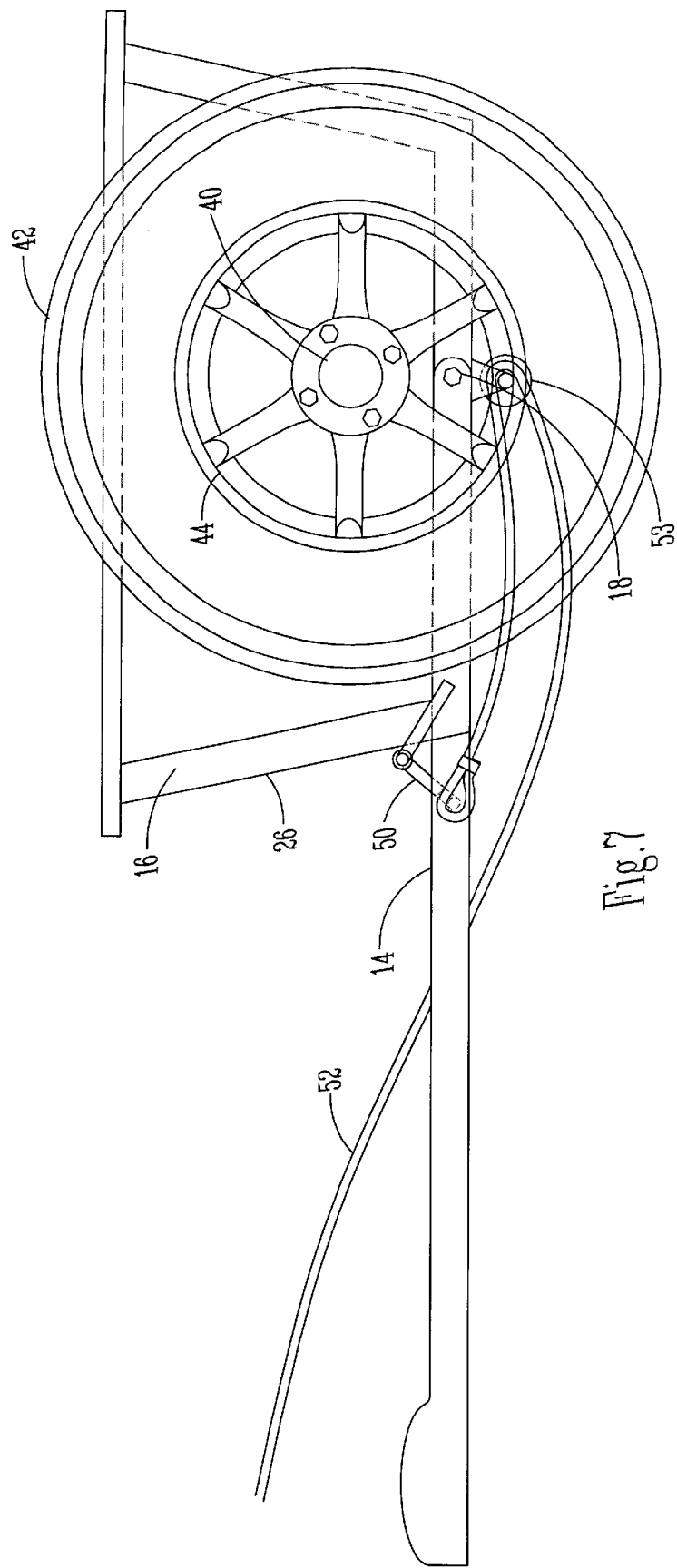

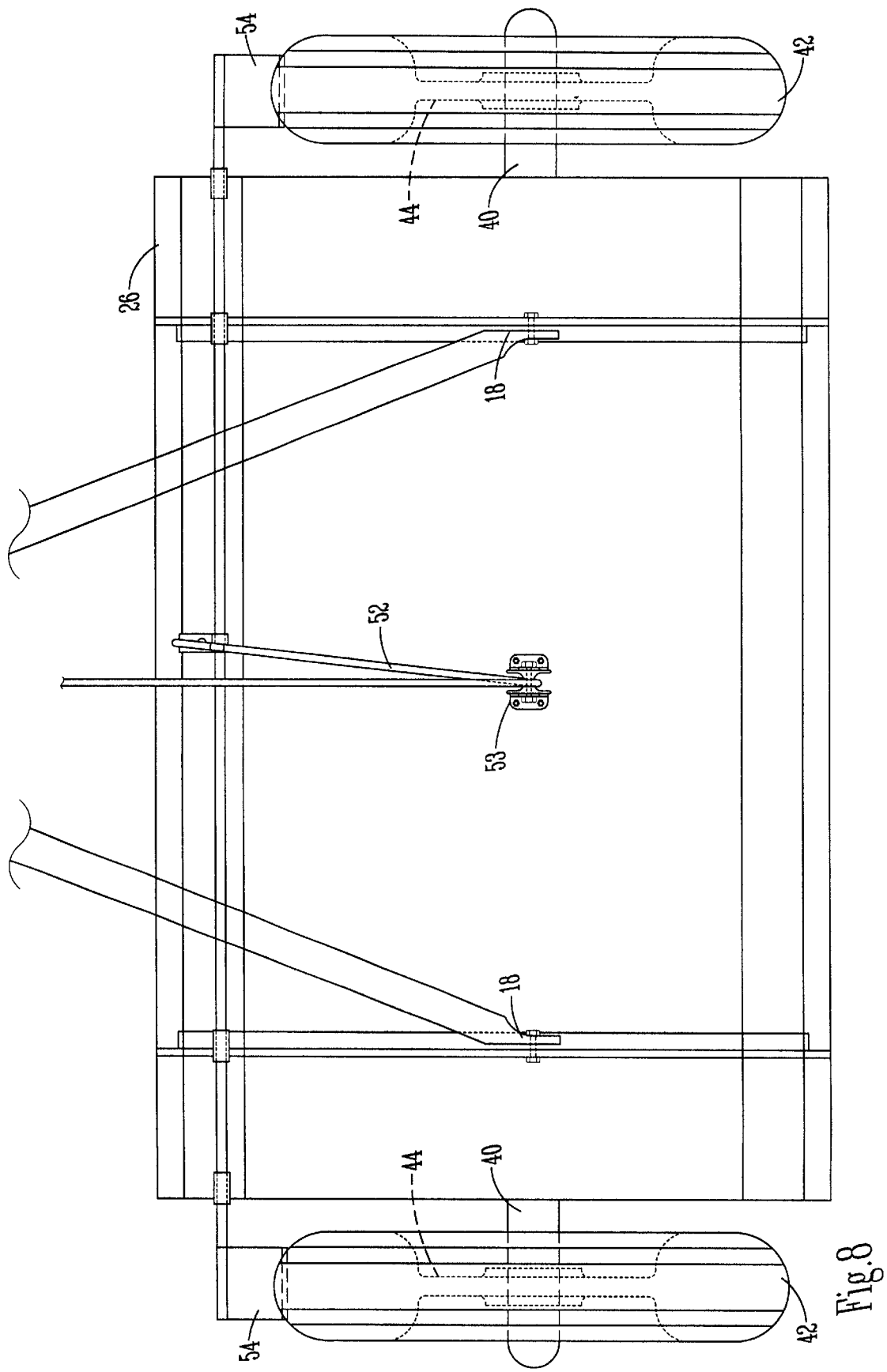

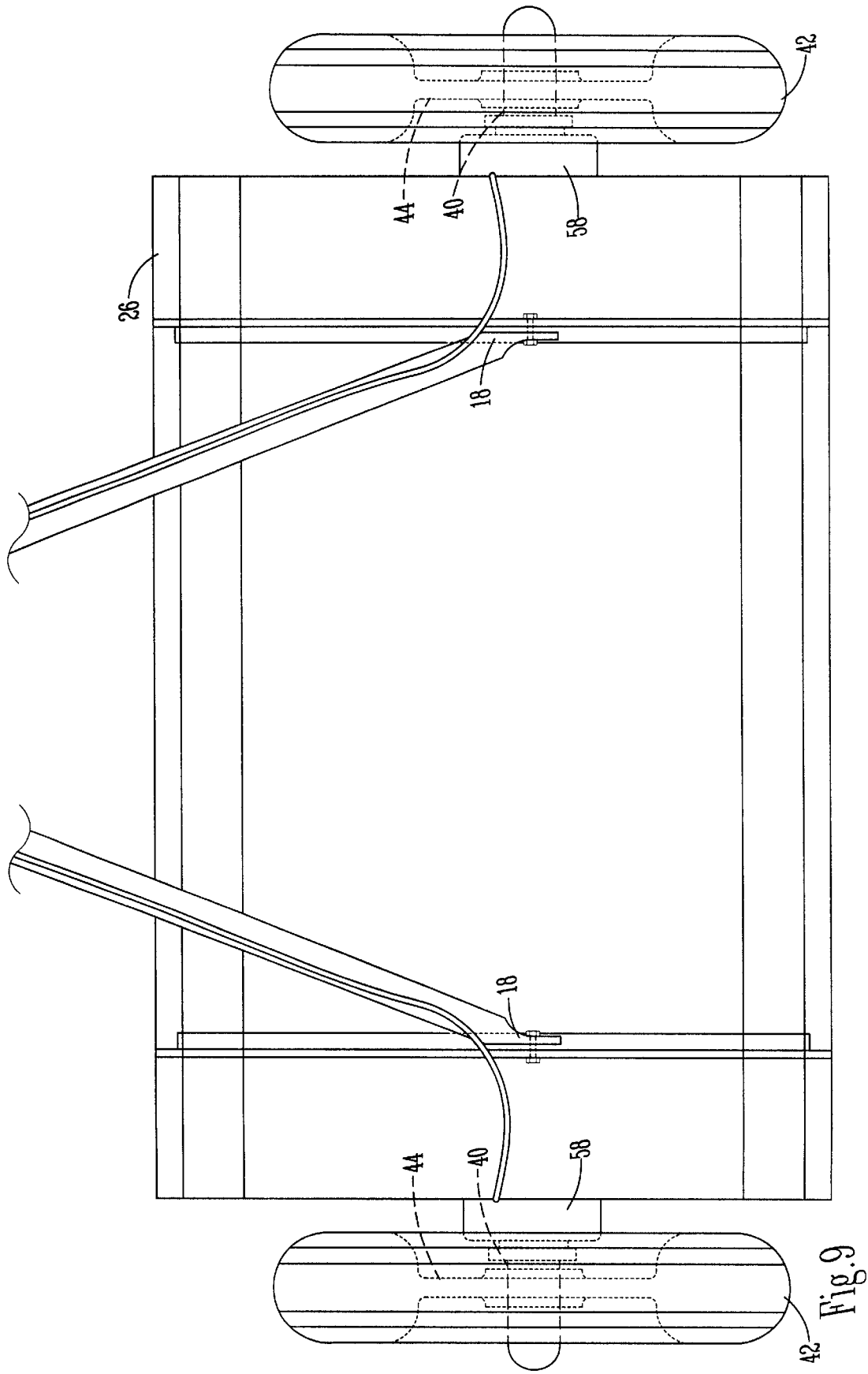

SELF-DUMPING CART

BACKGROUND OF THE INVENTION

The field of this invention relates generally to dump carts, and more particularly, to an improved dump cart apparatus and method for efficient self-dumping.

Agricultural, lawn and garden, and related industries typically utilize a cart, wagon, trailer or other transport to haul materials from place to place. Such a cart or transport may be pulled by an all terrain vehicle (ATV), a lawn or garden tractor, a tractor or other vehicle. Unloading the cart or transport presents potential problems. Unloading can be performed by manually removing the contents of the cart or transport, which is not a preferred method. Alternatively, unloading can be accomplished through dumping.

Various dump carts have been designed through the years in attempts to provide effective self-dumping. Problems with self-dumping carts are that some means is needed to secure the wheels of the cart against rotation. In addition, the cart may not achieve a substantially 180° dumping position.

For example, the Kaster patent, U.S. Pat. No. 2,131,326, shows a cart which is dumped by backing the trailer, but the wheels are secured against rotation during the dumping. Similarly, in the Boys patent, U.S. Pat. No. 1,563,685, the trailer is tipped when the vehicle is driven in reverse, but the wheels are secured against rotation via brakes.

In the Meisenhelder patent, U.S. Pat. No. 2,436,443, the cart is dumped when the tractor moves forwardly, with the wheels secured against rotation.

The Wirsbinski patent, U.S. Pat. No. 4,417,765, discloses a cart which dumps 180°, as shown in FIG. 7. However, the cart initially is dumped without backing up, and then the tractor is backed up to turn the cart over 180°, which also lifts the wheels substantially off the ground.

The Campbell patent, U.S. Pat. No. 4,889,390 discloses a trailer which tips when the tractor is moved rearwardly, but relies upon inertia to cause the trailer tray to slide in order to accomplish such dumping.

These inventions have not solved the problems that remain with self-dumping carts.

It is therefore a general object of the present invention to provide an improved dump cart.

A further objective is to provide for a dump cart that is easy to operate.

A still further objective is to provide for a dump cart that is safe to operate.

A still further objective is to provide for a dump cart that does not require auxiliary power for dumping.

Another objective of the present invention is the provision of a cart which can be rotated 180° from its frame to completely dump the contents of the cart.

A further objective of the present invention is the provision of a cart which dumps by rearward rotation of the cart wheels.

These and other objectives, features, and advantages of the present invention will be apparent to those skilled in the art.

SUMMARY OF THE INVENTION

The dump cart of the present invention includes a box that is mounted upon a frame having a tongue for hitching the cart to a vehicle, such as an ATV, a lawn tractor, a garden tractor, a tractor, or other vehicle for towing. The box is pivotally connected to the frame approximately mid-way between the front and rear edges of the box. Removable pins are provided for maintaining the cart in an upright position for loading and towing. When it is desired to empty the cart, the pins are removed and are inserted through a slot in the wheels for receipt in a bushing extending from each side of the cart. The tractor is then backed up, such that the wheels turn rearwardly, and at the same time pivot the cart about its pivot connection point to the frame due to the interlock between the cart and wheel provided by the pins. Preferably, the cart is short in height, such that the cart pivots 180° when dumped.

In an alternative embodiment, the pins are replaced with a lever which is pivotably moveable between a locked and unlocked position via a cord or rope. When the lever is in a latched position, the cart is ready for loading and towing. When the rope is pulled to unlatch the lever, the tire brakes lock the cart to the wheels, such that the cart will pivot rearwardly and dump when the vehicle is driven in reverse.

In a third embodiment, electric brakes are used to lock the cart to the tire, and thereby dump the box when the tractor is driven in reverse.

BRIEF DESCRIPTION OF THE DRAWINGS

FIG. 6 is a bottom view of the cart.

FIG. 7 is a side view of an alternative embodiment of the cart.

FIG. 8 is a bottom view of the cart of FIG. 7.

FIG. 9 is a bottom view of another alternative embodiment of the cart with an electrical brake mechanism.

DETAILED DESCRIPTION OF THE PREFERRED EMBODIMENT

Figure 1:
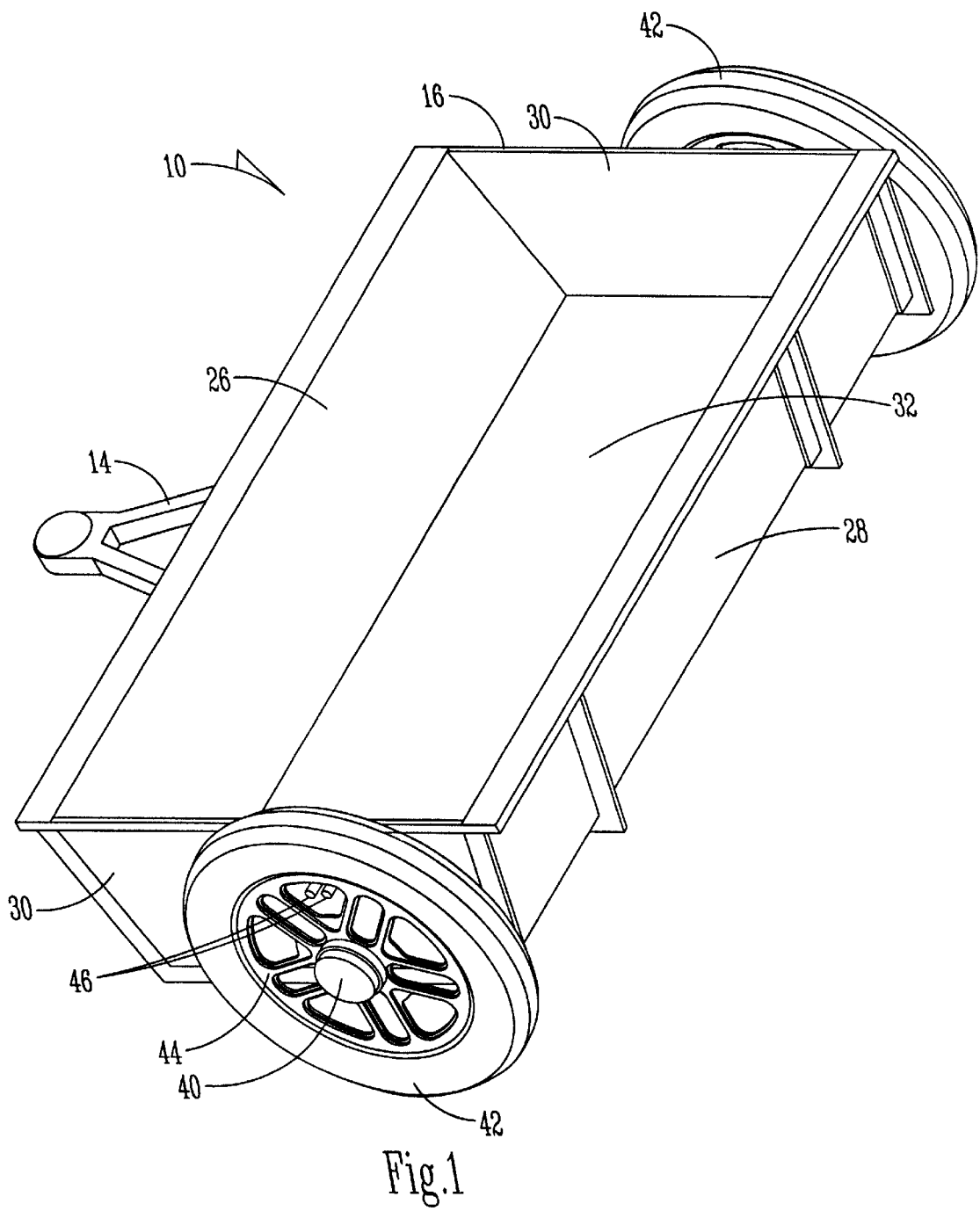
FIG. 1 is a perspective view of the cart in an upright position.

The self-dumping cart of the present invention is generally designated in the drawings by the reference numeral 10. The cart 10 includes a frame 12 with a tongue 14 for hitching the cart 10 to a vehicle for towing. A box 16 is pivotally mounted on the frame 12 at a pivot axis 18.

Figure 2:
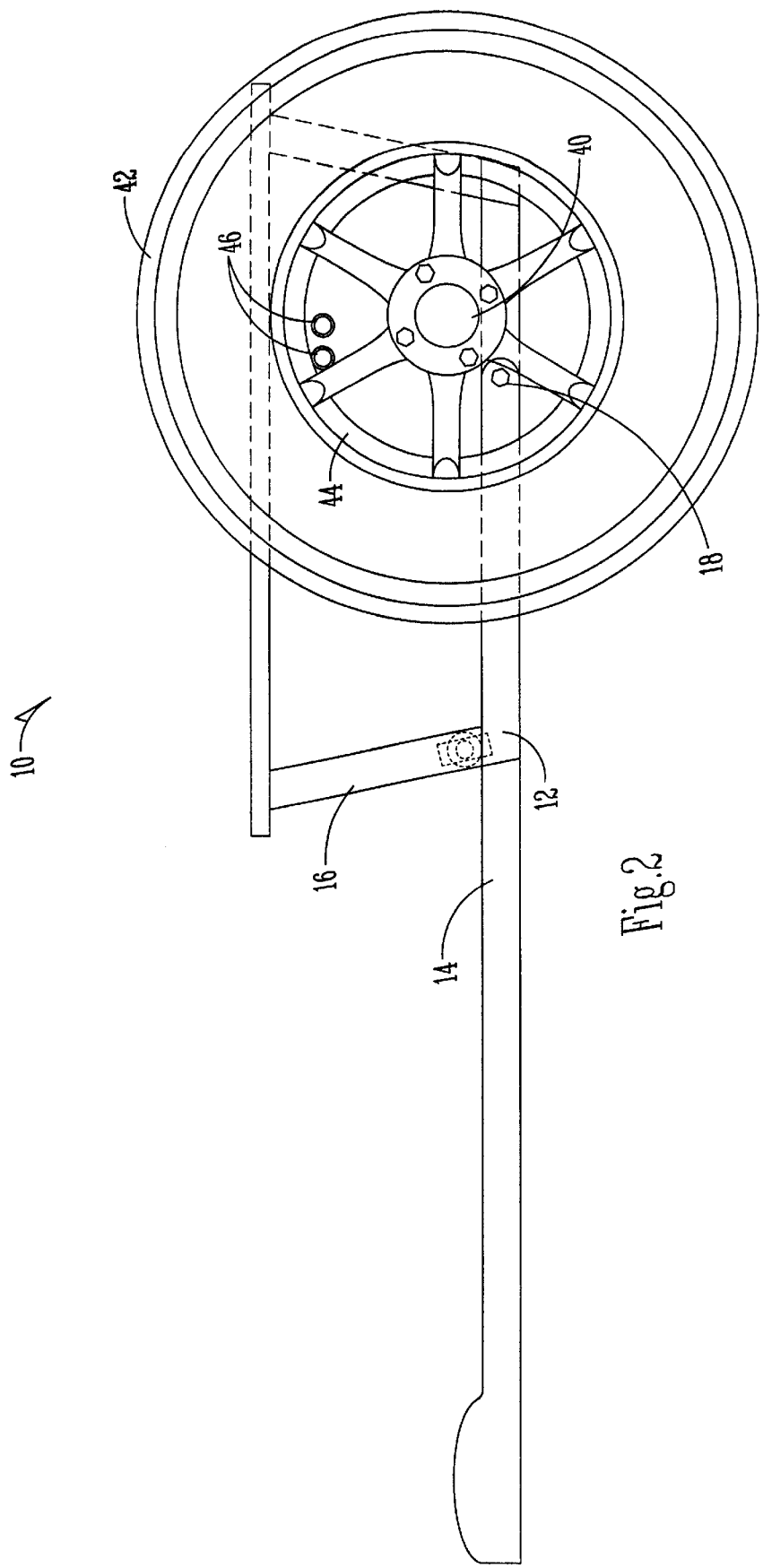
FIG. 2 is a side view of the cart in an upright position.
Figure 3:
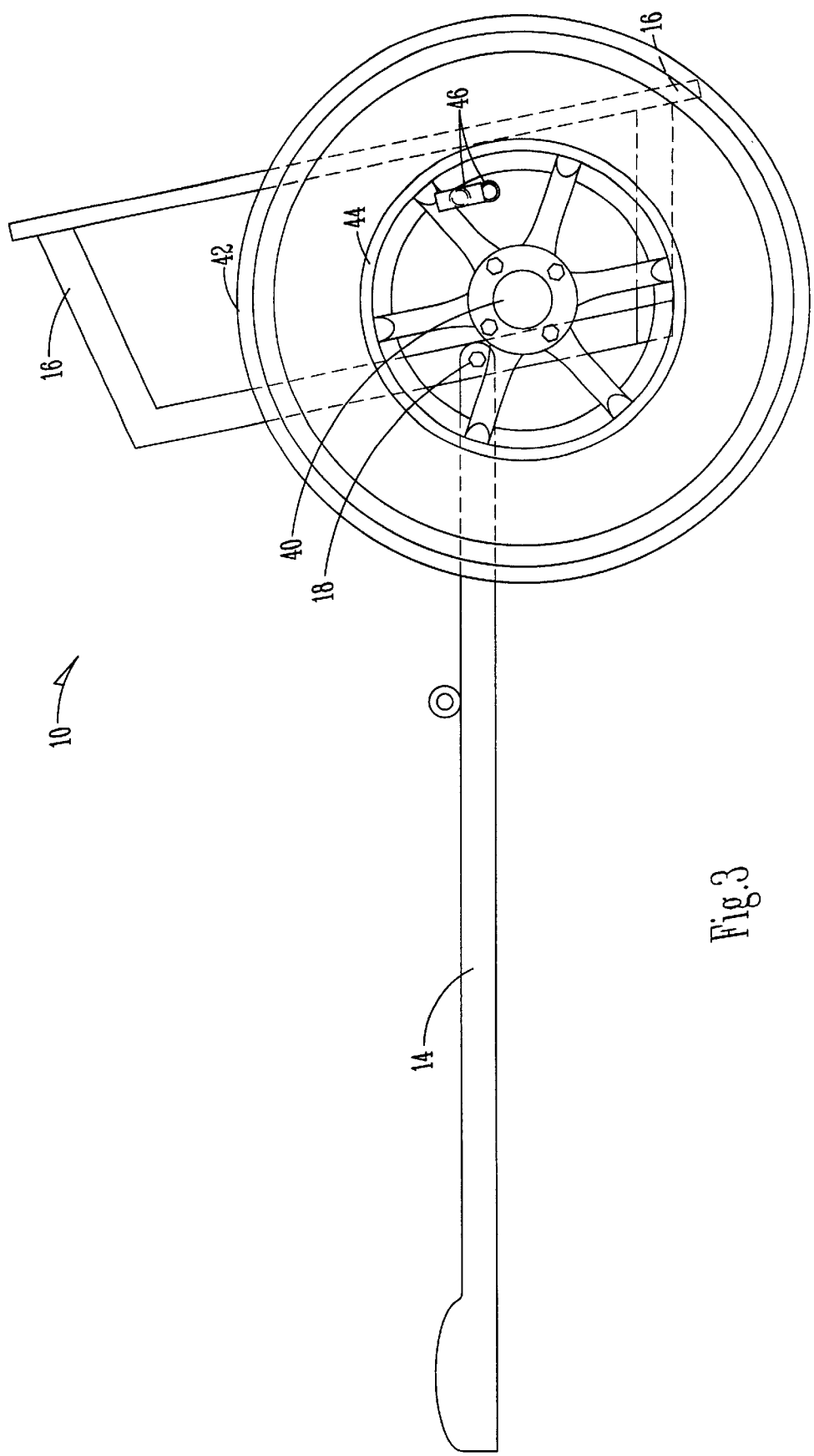
FIG. 3 is a side view of the cart in a partial dump position.
Figure 4:
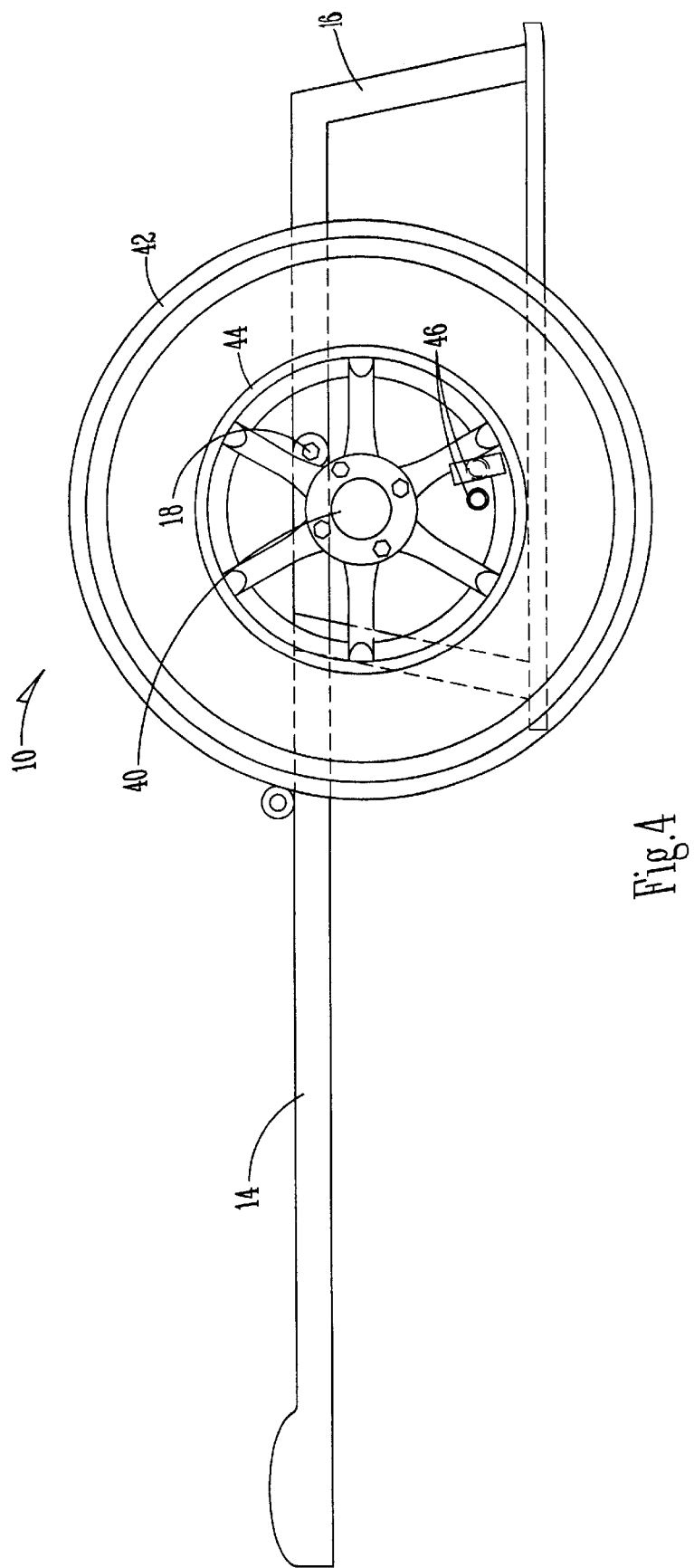
FIG. 4 is a side view of the cart in 180° full dump position.
Figure 5:
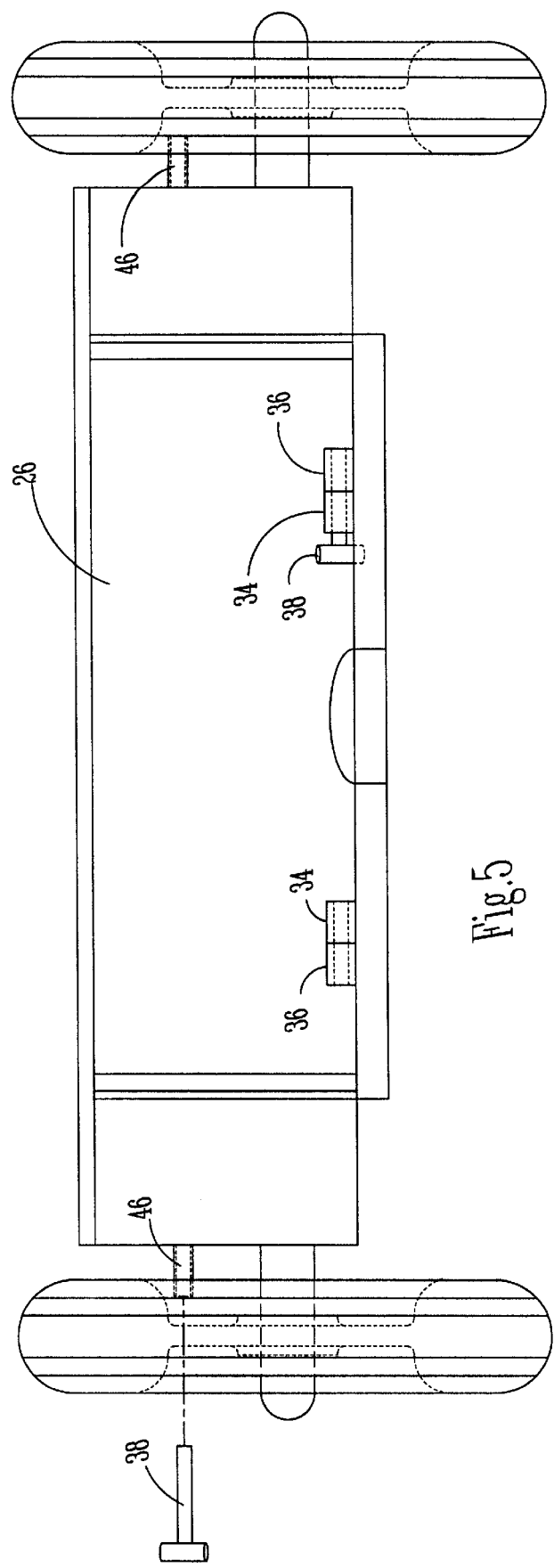
FIG. 5 is a front view of the cart in an upright position.

The box 16 includes a front wall 26, a rear wall 28, opposite side walls 30, and bottom wall 32. Preferably, the pivot axis 18 is positioned closer to the rear wall 28 than the front wall 26, as best seen in FIGS. 2 and 6. A pair of lock bushings 34 are welded or otherwise secured to the front wall 26 of the box 16. The lock bushings 34 are adapted to align with lock bushings 36 on the frame 12, as best seen in FIGS. 5 and 6. Locking pins 38 are adapted to be inserted into the aligned bushings 34, 36 to maintain the box 16 in an upright loading and towing position, as shown in FIGS. 1 and 2.

The frame 12 includes an axle 40 for rotatably supporting wheels 42. The wheels 42 include a rim 44 with one or more slots therein.

One or more dump bushings 46 extend from each side wall 30 of the box 16, as best seen in FIG. 5. The locking pins 38 are adapted to be removed from the lock bushings 34, 36, and inserted through one of the slots in the rim 44 into the dump bushings 46, thereby locking the box 16 to the wheels 42. Thus, upon backing up of the vehicle, the wheels 42 rotate rearwardly, with the dump bushings 46 moving in an arc so as to dump the box 16 relative to the frame 12. The height of the box 16 is preferably short enough to allow the box 16 to pivot 180° such that the contents of the box 16 is completely dumped therefrom.

Upon completion of dumping, the locking pins 38 are removed from the dump bushings 46 and reinstalled in the lock bushings 34, 36. Then, the box 16 can be loaded and the cart 10 towed to any desirable location. Depending on the depth of the box 16, the wheels 42 may rise slightly off the ground as the upper rear edge of the cart hits the ground.

In an alternative embodiment shown in FIGS. 7 and 8, a releasable latch 50 is provided on the front wall 26 of the box 16 for locking the box in an upright position. The latch 50 includes a rope or cord 52 extending around a pulley 53 on the bottom of the box 16, and then to the driver of the vehicle who can pull the rope 52 to release the latch 50. Such release of the latch 50 actuates brakes 54 which engage wheels 42, thereby locking the box 16 to the wheels 42. Then, upon rearward rotation of the wheels 42, the box 16 is pivoted to its dump position to empty the contents therefrom.

In a further embodiment shown in FIG. 9, the mechanical brakes 54 are replaced with electric brakes 58 which can be actuated by the vehicle driver in any convenient manner. The brakes 58 lock the box 16 to the wheels 42, whereupon rearward rotation of the wheels 42 causes the box 16 to pivot from the upright position to the dump position.

The preferred embodiment of the present invention has been set forth in the drawings, specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A dump cart comprising:

a frame;

a pair of wheels attached to the frame for rollably supporting the frame;

a locking means;

a box pivotally mounted on top of the frame;

the box being normally locked to the frame in an upright position with said locking means and alternatively, the box being locked to at least one of said wheels with said locking means for pivotal movement of the box to a dump position when the wheels are rotated rearwardly.

2. The dump cart of claim 1 wherein the locking means is a lock pin for locking the box to the frame and alternatively to at least one of the wheels.

3. A dump cart comprising:

a frame;

a pair of wheels attached to the frame for rollably supporting the frame;

a box pivotally mounted on top of the frame;

the box being normally locked to the frame in an upright position and alternatively being locked to at least one of said wheels for pivotal movement to a dump position when the wheels are rotated rearwardly;

the box pivots substantially 180° from the upright position to the dump position.

4. The dump cart of claim 1 wherein the frame includes a tongue for connecting the cart to a vehicle for towing.

5. The dump cart of claim 1 wherein the box includes a forward end with a bushing thereon and the frame includes a bushing aligned with the box bushing so as to removably receive a locking pin for locking the box in the upright position.

6. The dump cart of claim 1 wherein the box includes opposite sidewalls with upper edges and at least one bushing adjacent to the upper edge of at least one of said sidewalls, and wherein at least one of said wheels includes an opening alignable with the bushing so as to removably receive a pin for locking the box to the wheel for movement to the dump position upon rearward rotation of the wheel.

7. The dump cart of claim 1 wherein the box has opposite forward and rearward ends and is pivotally connected to the frame approximately midway between the forward and rearward ends.

8. A self-dumping cart, comprising:

a frame mounted on wheels for towing;

a box pivotally mounted on the frame for movement between an upright position and a dump position;

a first lock for locking the box to the frame in the upright position;

a lock pin for locking the box to at least one of the wheels for movement to the dump position upon rearward rotation of the wheels, the pin adapted to extend through one of the wheels and into a bushing on the box.

9. The dump cart of claim 1 further comprising a releasable latch moveable between a latched position for locking the box to the frame in the upright position and a release position for unlocking the box from the frame for movement to the dump position.

10. The dump cart of claim 9 further comprising a rope attached to the latch and wherein the rope is pulled to move the latch from the latched position to the release position.

11. The dump cart of claim 9 further comprising a brake operatively connected to the latch so as to engage at least one of the wheels when the latch is in the release position so as to lock the box to the wheel for movement to the dump position, and the brake being disengaged from the wheel when the latch is in the latched position.

12. The dump cart of claim 1 further comprising electrically activated brakes which disengage the wheels when the box is locked in the upright position and which engage the wheels so as to lock the box to the wheels when the box is unlocked from the frame.

* * * * *